United States Patent [19]

Wood

[11] 4,020,943
[45] May 3, 1977

[54] FRUIT FEEDING APPARATUS

[75] Inventor: Nyal B. Wood, Lake Hamilton, Fla.

[73] Assignee: FMC Corporation, San Jose, Calif.

[22] Filed: June 17, 1976

[21] Appl. No.: 697,093

[52] U.S. Cl. .............................. 198/445; 198/533; 198/539; 198/633

[51] Int. Cl.² ...................................... B65G 47/12

[58] Field of Search .......... 198/445, 446, 447, 533, 198/534, 539, 560, 565, 633

[56] References Cited

UNITED STATES PATENTS

| | | | |
|---|---|---|---|
| 2,164,676 | 7/1939 | Appleyard et al. ................ | 198/446 |
| 2,393,334 | 1/1946 | Mobley et al. ..................... | 198/560 |
| 2,581,732 | 1/1952 | Thompson ......................... | 198/453 |
| 2,679,309 | 5/1954 | Reading ............................. | 198/446 |
| 2,731,128 | 1/1956 | Herald et al. ...................... | 198/446 |
| 2,861,670 | 11/1958 | Read et al. ........................ | 198/408 |
| 3,040,864 | 6/1962 | Belk .................................... | 198/478 |
| 3,439,791 | 4/1969 | Matthews et al. ................. | 198/446 |
| 3,469,672 | 9/1969 | Stutske et al. ..................... | 198/458 |
| 3,623,592 | 11/1971 | Anderson .......................... | 198/446 |

Primary Examiner—Evon C. Blunk
Assistant Examiner—Richard K. Thomson
Attorney, Agent, or Firm—R. S. Kelly; C. E. Tripp

[57] ABSTRACT

Fruit feeding apparatus which is designed to accommodate loose bulk fruit moving upon an endless conveyor belt and to feed such fruit at right angles from said belt in a plurality of spaced single-file lanes. The apparatus includes a side guide wall adjacent one edge of the conveyor belt which wall has an opening therein to permit fruit to flow laterally from the belt only at a particular location. A hopper is positioned within the opening and includes a plurality of fruit lanes separated by upright lane walls. The lane walls terminate at a position spaced from the conveyor belt, and a shallow fruit supporting shelf extends between the lane walls and the belt. The shelf is of a width less than the diameter of a fruit such that a fruit which is received upon the shelf will be bumped by fruit on the conveyor belt until finding its way into one of the fruit lanes.

10 Claims, 5 Drawing Figures

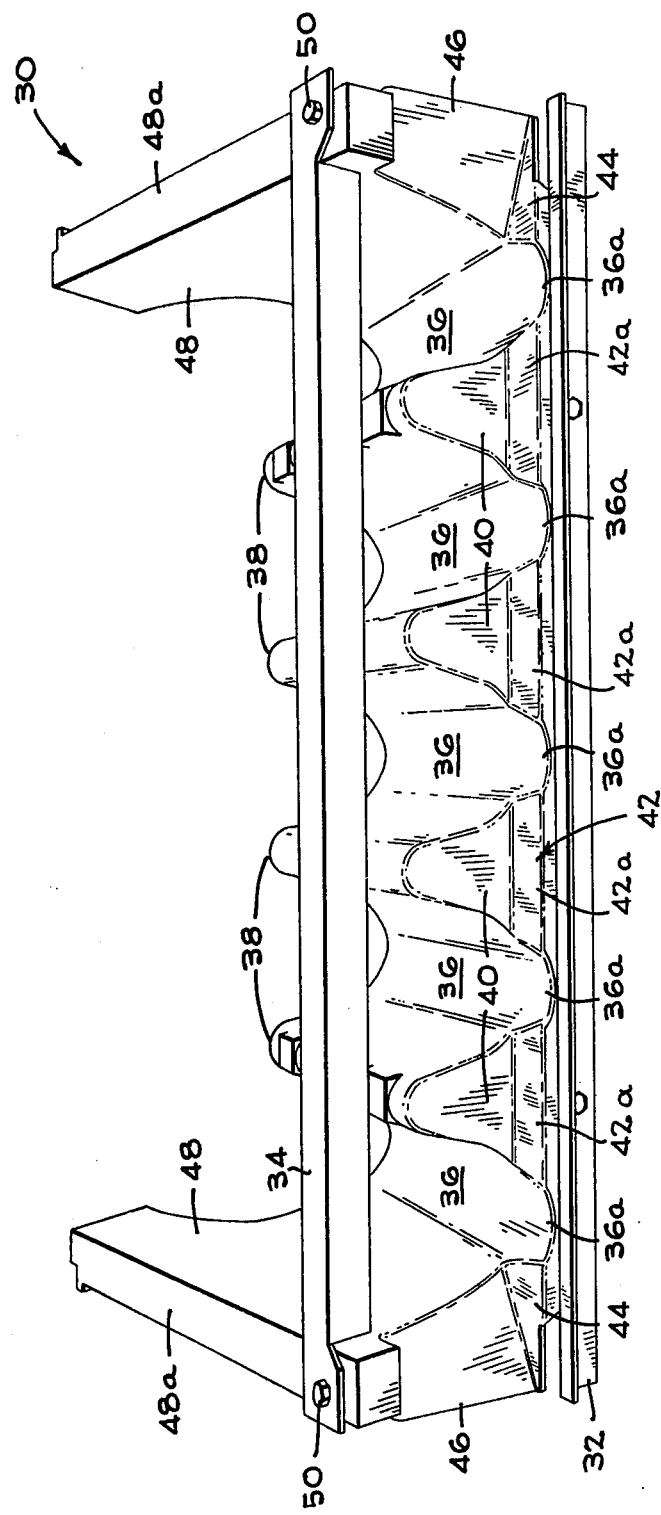
FIG_2

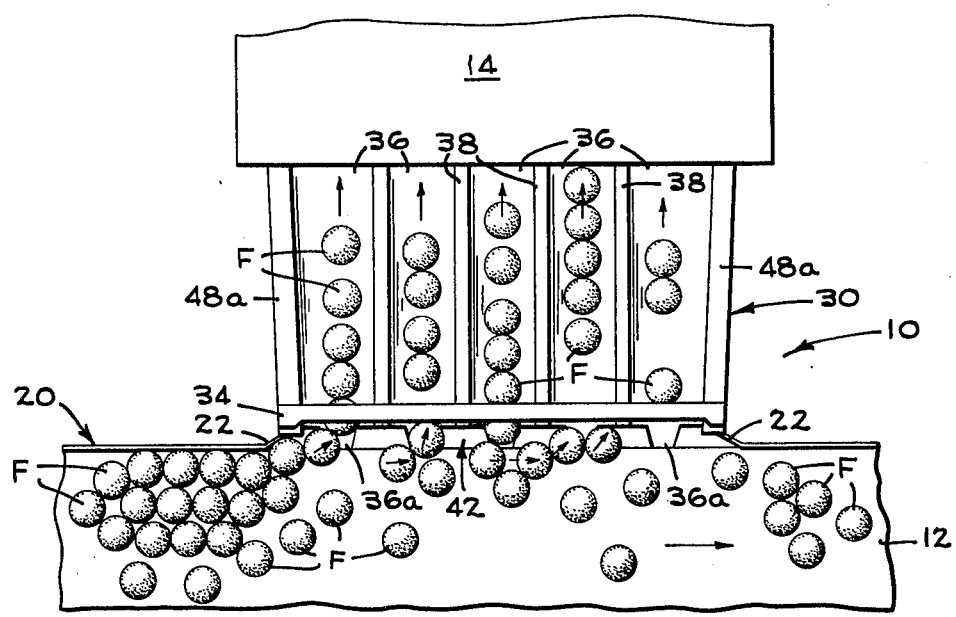
FIG_3
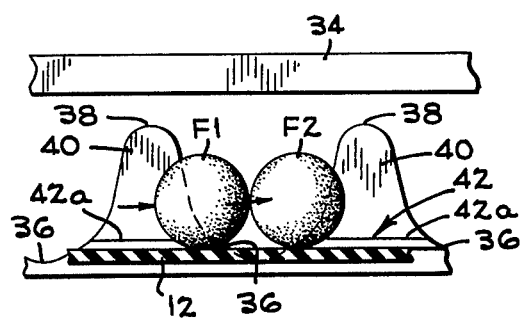
FIG_4
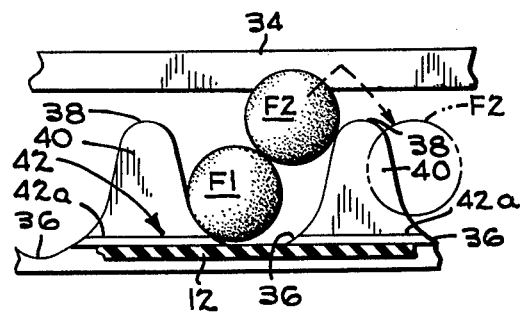
FIG_5

FRUIT FEEDING APPARATUS

BACKGROUND OF THE INVENTION

1. Field of the Invention

The present invention pertains to fruit handling and conveying apparatus, and more particularly, it pertains to apparatus for feeding fruit in spaced single file lanes at right angles from a bulk supply of loose fruit on a conveyor belt.

2. Description of the Prior Art

A common arrangement in high speed fruit handling operations is the feeding of fruit from a bulk supply of loose fruit on an endless conveyor belt into a plurality of uniformly spaced fruit feeding lanes which can then feed the fruit at a controlled rate to a particular processing machine which might perform some operation upon the individual fruit such as juice extraction, grading, etc. In a conventional arrangement the fruit is fed in bulk on a horizontally moving belt conveyor, and the fruit feeding lanes are arranged at right angles to the direction of movement of the conveyor at preselected location along the length thereof where the fruit can be diverted laterally off of the conveyor. Such fruit diversion is accomplished either by transversely inclining the conveyor toward the fruit lane feeding apparatus, or, by providing special diverting stripes or barriers to physically urge the fruit to the fruit lane feeding apparaus. A critical problem with such fruit feeding apparatus, as found for example in the feeding of citrus fruit, is the problem of preventing jamming at the inlet ends of the fruit feeding lanes. This problem is increased in its severity as the conveying speed of the fruit is increased.

A satisfactory means of solving the aforedescribed fruit jamming problem has long eluded the citrus fruit handling industry. For example, fruit lane feeding devices of the type described oftentimes required an operator whose sole function was to manually break up jams of fruit at the entrances of the fruit feeding lanes, i.e., where two fruit attempted to enter a lane at the same time and became squeezed together between the walls defining the entrance to the lane due to the pressure of the bulk fruit on the conveyor belt. It can be appreciated that the provision of an extra workman merely to solve fruit lane feeding problems can be a costly expense for fruit handling operations. On the other hand, if means are not provided for breaking up such jams at the entrances of the fruit feeding lanes, production in the fruit handling operation can be significantly curtailed.

SUMMARY OF THE INVENTION

By the present invention, a novel fruit feeding apparatus is provided wherein bulk supplies of loose fruit on a hoizontally moving conveyor belt can be diverted off into fruit feeding lanes extending at right angles to the conveyor belt with said conveyor belt operating at higher speeds than heretofore achieved and without creating the fruit jamming problems which have heretofore plagued the industry.

Basically, the fruit feeding apparatus of the present invention comprises a hopper with a plurality of fruit feeding lanes being provided therein, such lanes being defined by upwardly diverging walls which terminate at their inner ends (i.e., adjacent the conveyor belt) in upright end wall surfaces. The space between the end wall surfaces and the edge of the conveyor belt is occupied by a shallow fruit supporting inlet shelf portion of the hopper which is located in the plane of the conveyor belt and which has a width such that it is less than the diameter of a fruit but great enough so as to at least partially support a fruit thereon. Therefore, fruit which is moving along the conveyor belt will enter onto the shelf where it will be subjected to continual nudging and bumping from the other fruit passing by on the conveyor until such fruit enters into a lane between the end wall surfaces.

In the preferred form of the invention, a bar is positioned above the inner ends of the lane dividing walls whereby should two fruit attempt to enter a lane at the same time, the bumping of the trailing and passing fruit will cause at least one of the fruit to ride up on the upwardly diverging end edges of the lane dividing walls until it eventually is deflected by the overhead bar to permit the other of said fruit to be directed into the lane.

BRIEF DESCRIPTION OF THE DRAWINGS

FIG. 2 is an isometric view of the feed hopper of the present invention.

FIG. 3 is a diagrammatic view, in plan, of the apparatus shown in FIG. 1, said view particularly illustrating the manner in which the fruit is singulated into the lanes of the fruit feeding apparatus.

FIG. 4 is a diagrammatic end elevation of one of the lanes of the fruit feeding apparatus of the present invention particularly illustrating the condition wherein two fruit attempt to enter the lane at the same time.

FIG. 5 is a diagrammatic end elevation view similar to FIG. 4 but illustrating the position of the said two fruit after a short passage of time wherein one of said fruit will be deflected, as depicted in phantom lines.

DESCRIPTION OF THE PREFERRED EMBODIMENT

Figure 1:
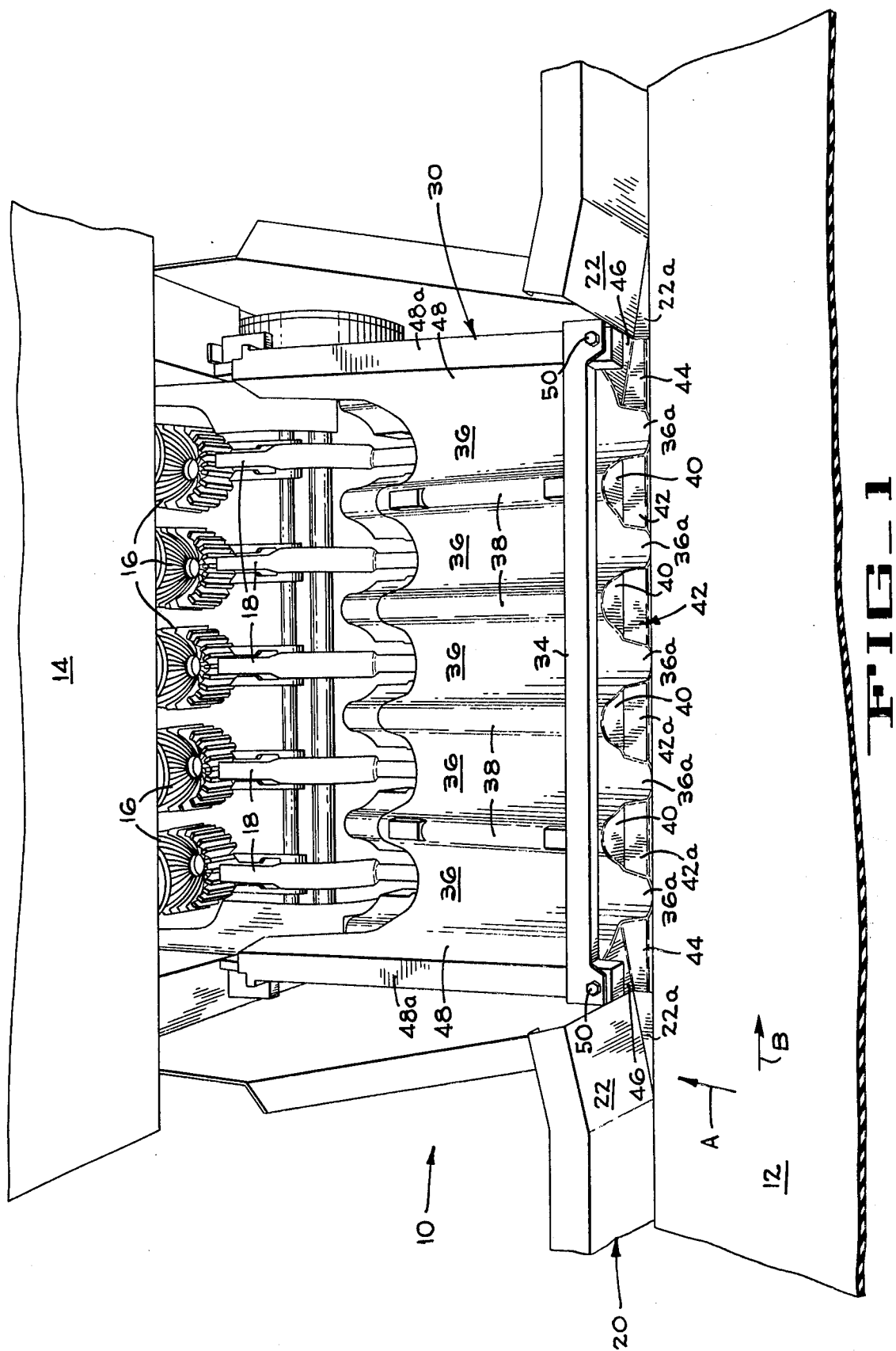
FIG. 1 is an overhead isometric view of the fruit feeding apparatus of the present invention as utilized to feed fruit from an endless conveyor belt to a fruit juice extraction machine.

With reference to FIG. 1, the fruit feeding apparatus 10 of the present invention is arranged to receive loose fruit from a bulk supply of fruit on an endless conveyor belt 12 and to feed such fruit in single file lanes to a fruit processing apparatus. In the illustration of the invention depicted in FIG. 1, such fruit processing apparatus will be seen to comprise a citrus fruit juice extraction machine 14 which includes a plurality of spaced cups 16 into which the fruit is adapted to be placed and a plurality of aligned feeding mechanisms 18 for feeding the fruit individually and in a timed sequence into the cups. The apparatus 10 of the present invention is designed to feed fruit in lanes which are in alignment with the fruit feeding mechanisms 18 and which extend downwardly from the conveyor belt to such feeding mechanisms. The fruit juice extraction machine 14 and the fruit feeding mechanisms 18 thereof are further and more completely described in prior U.S. Pat. No. 3,040,864 to Belk, issued on June 26, 1962, and such prior patent is specifically incorporated by reference herein. Since the structure and operation of such feeding mechanisms are in no way critical to an understanding of the present invention, they will not be described further herein.

In the arrangement of FIG. 1, the conveyor belt 12 is inclined downwardly in the transverse direction, i.e., in the direction of the arrow A, so that fruit will gravitate toward the lower end of the belt and against a stationary guide rail 20 there provided. The belt is moved in the longitudinal direction, as indicated by arrow B in FIG. 1, in a horizontal direction of movement. In order to accommodate the fruit feeding apparatus 10 of the present invention, the guide rail 20 is broken so as to form an opening therein and the end sections 22 of the guide rail adjacent to the opening are angled outwardly from the adjacent edge of the conveyor belt at a shallow acute angle. A narrow triangular support piece 22a extends from the outwardly turned sections 22 of the guide rail to provide fruit supporting surfaces between the guide rail and the belt 12.

The fruit feeding apparatus 10 of the present invention essentially comprises a fruit feeding hopper 30 which is shown in isolation in FIG. 2 of the drawings. The hopper 30 comprises a sheet metal frame structure which has secured across the front face thereof a mounting bar 32 for reception and mounting beneath the conveyor belt 12. A fruit diverter bar 34 which is mounted across the upper front end of the frame structure for a purpose to be later described. The hopper will be seen to be generally comprised of a plurality of troughs 36 which are uniformly spaced across the hopper to define fruit feeding lanes and which are separated by upright wall members 38 so that the walls of each trough diverge upwardly. The front, or inner, end of the lane dividing walls 38 terminate in end wall surfaces 40 which extend in a generally upright relationship to the bottoms of the adjacent feed troughs 36.

One of the key features of the present invention is the provision of a fruit supporting inlet shelf 42 which extends from the end wall surfaces 40 of lane dividing walls 38 to the discharge edge of conveyor belt 12, as shown in FIG. 1. This shelf 42 extends generally in the plane of the conveyor belt and will be seen to be comprised basically of alternating flat portions 42a between the troughs 36 and grooved portions 36a at the entrances of the troughs. At the upstream and downstream ends of the shelf a narrow triangular section 44 is provided which is adapted to be received beneath and in engagement with the support pieces 22a extending from the end sections 22 of the guide rail so that the fruit will have a smooth entrance and exit path from the conveyor 12 onto and off of the support shelf 42. Adjacent the support sections 44 and extending vertically therefrom are guide walls 46 which, as shown in FIG. 1, are aligned with the end sections 22 of the guide wall 20 to define a smooth inlet and exit guide wall to the fruit feeding apparatus. The sidewalls 48 of hopper 30 which extend rearwardly from the guide walls 46 will be seen to extend vertically above the lane dividing walls 38 and terminate in flat upper surfaces 48a upon which the diverter bar 34 is mounted by means of bolts 50. The diverter bar is mounted upon the front end of such side walls 48 above the entrance to the feed troughs 36, as shown in FIG. 3.

It is important to the present invention that the width of the support shelf 42 be carefully designed with regard to the product to be fed into the lanes 36. The width of shelf 42 should be such that up to half of a fruit which is received on the shelf will extend outwardly of the shelf over the conveyor belt wherein it can be bumped by fruit passing along upon the conveyor belt. This will insure that the fruit will be directed into one of the fruit lanes, or, in the event that such lanes are jammed, that the fruit will be moved along the shelf and ultimately directed back onto the conveyor belt. It is also important that the shelf be made wide enough to support at least a portion of each fruit so that the fruit will be effectively removed from the main conveyor flow and allowed to enter into the fruit feeding lanes. It should be remembered that any given run of fruit will extend over a range of sizes and that some of the fruit may, therefore, not fit the required dimensions with regard to the aforedescribed shelf width. It will be understood, however, that the significant majority of the fruit should bear the aforedescribed relationship to the shelf width dimension. Preferably, the shelf width should be great enough so that the majority of the fruit will be entirely received and supported upon the shelf although having portions thereof sticking out over the converyor belt. By way of example, when feeding 3 inch (maximum=3¼ in.; avg. =2⅝-2¾ in.) and 4 in (max 4¼ in.; avg. =3⅝ in.) oranges along the conveyor, the width of the shelf should be approximately 2 inches. For larger fruit sizes, the width of the shelf should be correspondingly increased.

The operation of the fruit feeding apparatus of the present invention can be seen with regard to the illustration in FIG. 3 of the drawings. It will be seen that fruit F carried along the conveyor belt 12 will be directed to the lower inclined side of the belt directly adjacent to the fruit feeding apparatus 10. The inlet shelf 42 of the apparatus allows the fruit on the conveyor belt to bypass fruit which is stuck on the shelf before it enters the lanes but not without first striking such fruit to give it impetus to enter into the lanes. Jams are prevented since the entrance to the fruit feeding lanes 36 is recessed from the edge of the conveyor belt; therefore, direct conveyor belt fruit pressure is not exerted against the fruit.

In the event that two fruit do enter between a pair of lane dividing walls 38 at exactly the same time so as to tend to become compressed therebetween, the diagrammatic illustrations of FIGS. 4 and 5 show how the problem is accommodated. In FIG. 4, it will be seen that two fruit, F1 and F2, are in a wedging position at the entrance to one of the fruit feeding lanes 36 and between the edges of the walls 38 at the end wall surfaces 40. As indicated by the arrows in FIG. 4, the pressure from the fruit on the conveyor or from trailing fruit will be in the downstream direction. Thus, the downstream fruit F2 will tend to ride up on the upwardly and outwardly inclined surfaces of the walls until it strikes the overhead diverter bar 34 and is thereby deflected out of the lane path to allow the fruit F1 to pass into the lane.

Although not a critical part of the present invention, it will be understood that the hopper 30 may be continuously vibrated during the feeding operation. In this regard, attention is directed to the showing of feed hopper vibratory means in the aforementioned U.S. Pat. No. 3,040,864 to Belk.

From the foregoing description it will be seen that the fruit feeding apparatus of the present invention provides a method for feeding fruit at right angles from a belt conveyor into single file spaced lanes while automatically overcoming the fruit jamming problems which frequently plagued the prior art devices. The apparatus is relatively simple in construction with no expensive parts, and, therefore, the advantages of such invention in increasing fruit feeding rates and eliminating otherwise needed manual labor will be obvious.

Although the best mode contemplated for carrying out the present invention has been herein shown and described, it will be apparent that modification and variation may be made without departing from what is regarded to be the subject matter of the invention.

What is claimed is:

1. Fruit feeding apparatus for feeding singulated fruit of round shape in spaced parallel lanes at right angles from a bulk supply of loose fruit on a generally horizontally moving conveyor belt, said apparatus comprising a hopper positioned directly adjacent to one edge of said conveyor belt, said hopper having a plurality of spaced fruit feeding lanes extending at right angles from said belt and being defined by upwardly diverging walls, said walls terminating at their inner ends in end wall surfaces extending in upright relationship to the bottom of said lanes and being spaced outwardly from said edge of said belt, said hopper including a shallow fruit supporting inlet shelf extending generally in the plane of said conveyor belt from said belt to said end wall surfaces, said inlet shelf having a width measured at right angles to said belt between said belt and said end wall surfaces which is less than the diameter of a fruit but which is great enough so as to at least partially support a fruit thereon, whereby fruit on said belt will be caused to enter onto said inlet shelf of said hopper where a portion of each of said fruit will be subject to bumping by other fruit moving on said belt until entering into one of said fruit feeding lanes.

2. Fruit feeding apparatus according to claim 1 including a deflecting bar mounted above said inner ends of said walls defining said fruit feeding lanes, said bar being spaced above said shelf by a distance greater than the diameter of a fruit but less than twice the diameter of a fruit.

3. Fruit feeding apparatus according to claim 1 wherein said shelf is provided with shallow grooved portions positioned in alignment with said fruit feeding lanes.

4. Fruit feeding apparatus according to claim 1 wherein the upstream and downstream ends of said shelf are tapered towards said edge of said conveyor belt, and upright wall means positioned adjacent to said tapered end portions of said shelf for guiding fruit from said belt onto said shelf and from said shelf onto said belt.

5. Fruit feeding apparatus according to claim 1 wherein the width of said shelf is great enough so as to support a fruit independently of said conveyor belt before said fruit enters into one of said feeding lanes.

6. Fruit feeding apparatus for feeding singulated fruit of round shape in spaced parallel lanes at right angles from a bulk supply of loose fruit on a generally horizontally moving conveyor belt, said apparatus comprising a guide rail positioned parallel to and directly adjacent to one edge of said conveyor belt for maintaining said fruit on said belt, said guide rail having an opening therein for permitting the discharge of fruit from said belt in a preselected location, the ends of said guide rail at each side of said opening being angled away from said belt at an acute angle with said edge of said belt, and a hopper positioned within said ends of said guide rail at said opening, said hopper having a plurality of spaced fruit feeding lanes extending at right angles from said belt and being defined by upwardly diverging walls, said walls terminating at their inner ends in end wall surfaces extending in upright relationship to the bottom of said lanes and being spaced outwardly from said edge of said belt, said hopper including a shallow fruit supporting inlet shelf extending generally in the plane of said conveyor belt from said belt to said end wall surfaces, said inlet shelf having a width measured at right angles to said belt between said belt and said end wall surfaces which is less than the diameter of a fruit but which is great enough so as to at least partially support a fruit thereon, said inlet shelf having tapered end portions, said hopper having side walls adjacent said tapered end portions aligned with said ends of said guide rail whereby fruit on said belt will be caused to enter onto said inlet shelf of said hopper where a portion of each of said fruit will be subject to bumping by other fruit moving on said belt until entering into one of said fruit feeding lanes.

7. Fruit feeding apparatus according to claim 6 including a deflecting bar mounted above said inner ends of said walls defining said fruit feeding lanes, said bar being spaced above said shelf by a distance greater than the diameter of a fruit but less than twice the diameter of a fruit.

8. Fruit feeding apparatus according to claim 6 wherein said shelf is provided with shallow grooved portions positioned in alignment with said fruit feeding lanes.

9. Fruit feeding apparatus according to claim 6 wherein the upstream and downstream ends of said shelf are tapered towards said edge of said conveyor belt, and upright wall means positioned adjacent to said tapered end portions of said shelf and in alignment with said ends of said guide rail for guiding fruit from said belt onto said shelf and from said shelf onto said belt.

10. Fruit feeding apparatus according to claim 6 wherein the width of said shelf is great enough so as to support a fruit independently of said conveyor belt before said fruit enters into one of said feeding lanes.

* * * * *